United States Patent [19]
Anderson et al.

[11] Patent Number: 5,662,189
[45] Date of Patent: Sep. 2, 1997

[54] CABLE LUBRICATING DEVICE AND METHOD

[76] Inventors: Ronald A. Anderson, 4514 SW. Trenton, Seattle, Wash. 98136; Matthew P. Veeder, 16110-38th Ave. NW., Stanwood, Wash. 98292

[21] Appl. No.: 641,099

[22] Filed: Apr. 29, 1996

[51] Int. Cl.$^6$ .................................................. F16N 7/16
[52] U.S. Cl. ........................................ 184/15.2; 184/15.1
[58] Field of Search ............................... 184/15.1, 15.2, 184/15.3, 16, 17

[56] References Cited

U.S. PATENT DOCUMENTS

| | | | |
|---|---|---|---|
| Re. 34,852 | 2/1995 | Burroughs. | |
| 3,144,916 | 8/1964 | Lien | 184/105 |
| 4,452,097 | 6/1984 | Sünkel. | |
| 4,498,558 | 2/1985 | Bendahan. | |
| 5,080,197 | 1/1992 | Nelson. | |
| 5,326,292 | 7/1994 | Brushaber. | |
| 5,385,493 | 1/1995 | Nelson. | |
| 5,443,407 | 8/1995 | Burroughs. | |

FOREIGN PATENT DOCUMENTS

| | | | |
|---|---|---|---|
| 0475400 | 4/1929 | Germany | 184/15.2 |
| 0528881 | 12/1957 | Italy | 184/15.1 |
| 0209308 | 1/1924 | United Kingdom | 184/15.1 |
| 0257790 | 9/1926 | United Kingdom | 184/15.1 |
| 0617909 | 2/1949 | United Kingdom | 184/15.2 |
| 0720983 | 12/1954 | United Kingdom | 184/15.1 |

*Primary Examiner*—Thomas E. Denion
*Attorney, Agent, or Firm*—Ronald M. Anderson

[57] ABSTRACT

An apparatus and method for lubricating a sheathed cable in situ. To lubricate a sheathed cable (300), an access aperture (304) is first cut through the sheath. A file (400) may be used to create the access aperture. A cable lubrication applicator (100) includes a top plate (102), a bottom plate (112), a lubrication fitting (110), and fasteners (106) that hold the top plate and bottom plate clamped around the sheathed cable, at the access aperture. Once the applicator is installed, a lubricant is injected into the sheathed cable through the lubrication fitting. After lubricating the sheathed cable, the applicator is removed, and a sealer (200) is installed over the access aperture. The sealer includes a top plate (202), a bottom plate (214), a gasket (210), and fasteners (206) that hold the top plate and bottom plate of the sealer together, with the gasket covering the access aperture. The sealer prevents the ingress of corrosive materials into the access aperture and the leakage of lubricant from the sheathed cable, and in addition, restores any structural strength to the sheathed cable that was lost when the access aperture was cut into the sheath.

31 Claims, 5 Drawing Sheets

CABLE LUBRICATING DEVICE AND METHOD

FIELD OF THE INVENTION

The present invention relates to an apparatus and method for lubricating control cables, and more particularly, to an apparatus and method for injecting lubricant into a sheathed control cable that includes a relatively rigid sheath.

BACKGROUND OF THE INVENTION

Sheathed cables are regularly used to remotely transmit control actions from mechanical controls to equipment on marine vessels. These control actions, which may be viewed as mechanical commands, are transmitted by the extension or retraction of a wire cable from its sheath in response to the physical displacement of a lever or other type control. For example, the position of a vessel steering wheel is typically transmitted by a sheathed cable that connects the steering wheel to a rudder control mechanism, or to the housing of an outboard motor to control its angle relative to the transom of the vessel. Any change in the orientation of the steering wheel extends or retracts the wire cable from its sheath. This change in wire cable extension moves the rudder or other steerage control mechanism to a desired orientation.

A sheathed cable can also be used to control the speed of a vessel. The sheathed cable is connected between a throttle lever at the navigation station and a throttle on the engine. A displacement in the position of the throttle lever causes an extension or retraction of the wire cable from its sheath. The wire cable displacement is translated by the throttle into a new speed for the vessel engine.

The biggest threats to the physical integrity and smooth operation of wire control cables on a vessel are mechanical damage, wear, and corrosion. To combat these threats, manufacturers of wire cables have developed sophisticated cable sheathing. A sheathed cable is a flexible tube with a movable wire control line extending through the tube and beyond each end. Usually, a control line is constructed of several strands wrapped concentrically around each other to create a single control line. This type of cable is strong, flexible, and resists stretching. The control line can freely extend or retract along the longitudinal axis of the sheath. Typically, a cable sheath has at least three distinct material layers: an interior low friction coating, a middle armored layer, and a sealed exterior layer. The interior layer of the sheath comprises a smooth and flexible material that is in direct contact with the control line. The smooth interior surface is designed to reduce cable binding and wear and to minimize friction relative to movement of the control line. Thus, many manufacturers prelubricate the wire cable and interior surface of the sheath with a grease to reduce friction and prevent the ingress of corrosive materials, such as salt water. The middle layer of the sheath is often constructed with helically wound or coiled steel wire strands. The steel wire strands permit the sheath to remain flexible, but provide resistance to mechanical compression and kinking. The exterior layer of the sheath is a hard but flexible material that resists cuts, abrasions, and the ingress of corrosive materials. The three sheath layers in combination provide a smooth, strong, and flexible longitudinal pathway for a control line.

The control line in an installed sheathed cable is constantly extending and retracting to transmit navigational commands and other control actions. Corrosive materials such as salt spray can be deposited on the surface of the control line as it extends from its sheath. Subsequently, these materials are drawn inside the sheath as the control line is retracted. Once inside the sheath, the corrosive materials begin acting on the control line, increasing the friction that resists its longitudinal movement through the passage in the sheath. An increase in friction will cause the control line to bind and wear excessively. Another consequence is an acceleration of the natural oxidation of the metal strands that comprise the control line. Oxidation of the wire strands will weaken the control line, eventually causing it to break. Also, the ability of the control line to extend and retract with minimal compressibility is impaired as oxidation increases. The deleterious consequences of the ingress of corrosive materials inside a cable sheath can seriously threaten the physical integrity and reliability of a control line, requiring that the sheathed cable be removed and replaced. Removal and replacement of such cables can be relatively labor intensive and costly, because the cables are often routed through restricted access areas on a vessel. These problems also can arise (but usually to a lesser extent) when sheathed cables are used in other non-marine applications.

Wire cable manufacturers recognize that corrosive materials will inevitably be dram inside cable sheaths that are installed on a marine vessel, and that even if corrosion does not occur, the prelubrication will eventually dissipate, causing wear and eventual failure of the sheathed cable. Subsequently, these manufacturers recommend that regularly scheduled lubrication of sheathed cables should be part of a preventive maintenance program. One method used to lubricate a sheathed cable is to remove the sheathed cable from its installation, lubricate the control line inside the sheath, and then reinstall the cable. The expense of regularly removing, lubricating, and reinstalling sheathed cables has created a long felt need in the marine industry (and in other industries in which such cables are used) to lubricate the cables in situ. One solution to this problem might be to introduce a lubricant into the passage within the sheath through a fitting at the ends of a sheathed cable. Unfortunately, the ends of a sheathed cable are not always readily accessible in a marine vessel. The cost to access the ends of a sheathed cable on a marine vessel could easily negate the benefit of lubricating the control line without removing the sheathed cable. Accordingly, there is clearly a need for an alternative approach for injecting lubricant into the passage of a sheathed cable.

SUMMARY OF THE INVENTION

A first aspect of the invention that is described in detail below is an apparatus for lubricating a sheathed cable in place. The apparatus includes a lubricant applicator for injecting lubricant into the sheathed cable. Before the lubricant applicator is attached to the sheathed cable, an access aperture is formed in the sheath of the cable. A sealer is subsequently used to seal the access aperture. The access aperture can be at any point along the length of the sheath and serves as a fluid path from the lubricant applicator to an interior passage of the sheathed cable.

After the access aperture is created, the lubricant applicator is clamped around the sheathed cable, at the access aperture. The lubricant applicator comprises a top plate, a bottom plate, a lubrication port disposed in the top plate, a longitudinal top channel in the top plate, a longitudinal bottom channel in the bottom plate, and fasteners to hold the top plate and the bottom plate together, with the sheathed cable clamped between the top and the bottom plates. The sheathed cable is positioned in the longitudinal channels, between the top plate and the bottom plate and generally parallel with their longitudinal axes. The top plate is positioned so that the lubrication port in the top plate overlies the access aperture and is connected to the bottom plate with the fasteners. The top channel and the bottom channel at least partially enclose the sheathed cable. A lubricant is injected into an interior passage within the sheathed cable through the lubrication port. Formed or elastomeric adapter plates may optionally be included between the top and bottom plates to enable the lubricant applicator to be used with sheathed cables having a smaller cross-sectional size than that of the longitudinal channels.

After the sheathed cable has been lubricated, the lubricant applicator is removed and the sealer is installed. The sealer comprises a top plate, a gasket, a bottom plate, a longitudinal top channel in the top plate, a longitudinal bottom channel in the bottom plate, and fasteners to hold the top plate and the bottom plate clamped together around the sheathed cable. The access aperture is sealed by the two plates. Preferably, a gasket is placed on top of the access aperture to ensure a complete seal of the access aperture. Finally, the top plate and the bottom plate are coupled together with the fasteners. The installed sealer protects against the ingress of corrosive materials and against lubricant leakage from inside the sheathed cable.

The invention is also a method for lubricating sheathed cables. The method comprises the steps that are generally consistent with the functions discussed above, in connection with the apparatus.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Lubrication Applicator

Figure 1:
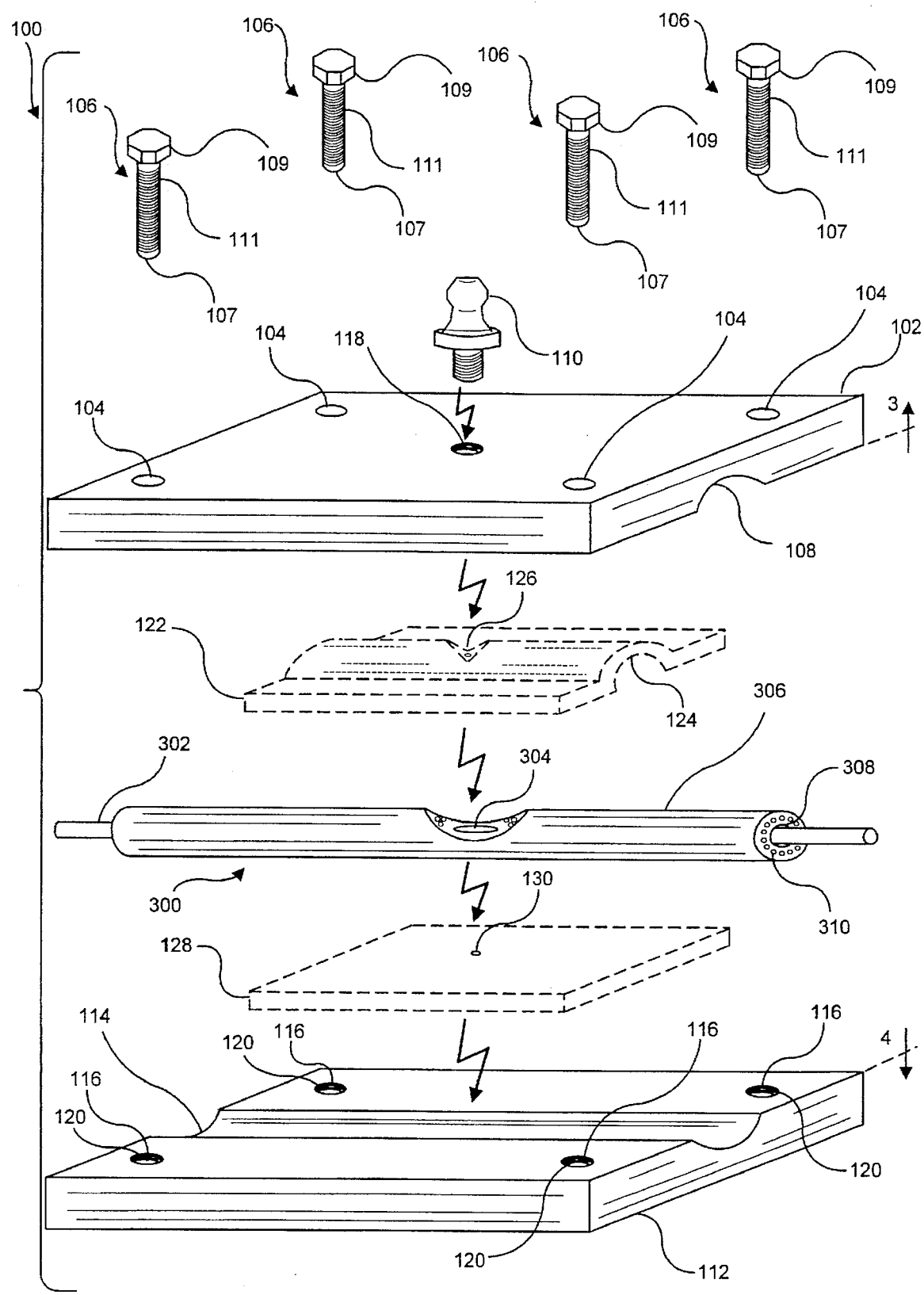
FIG. 1 is an exploded view of a cable lubrication applicator, an optional adapter, and a sheathed cable that has been prepared to receive an injection of lubricant.
Figure 3:
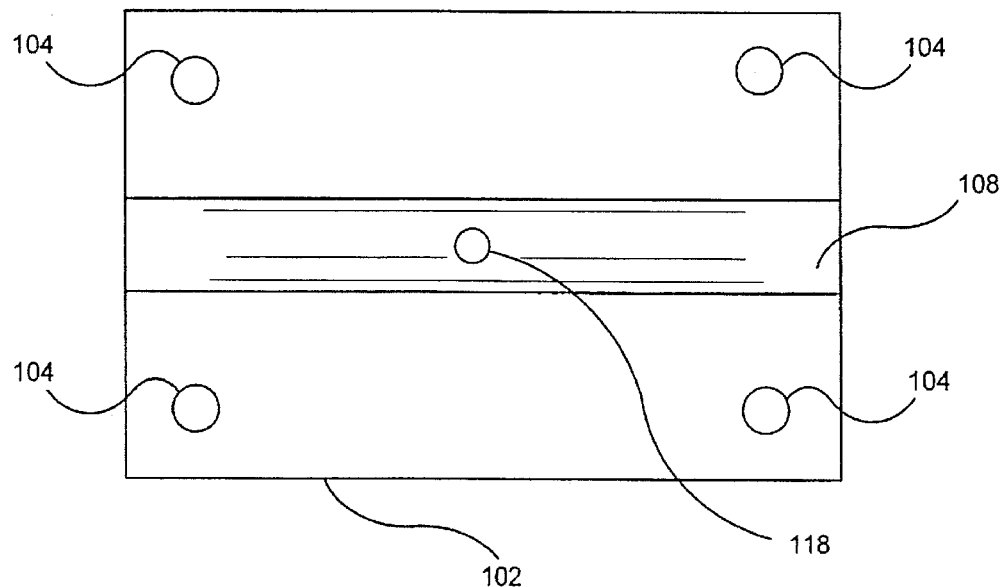
FIG. 3 is a plan view of the longitudinal channel in the top plate of the cable lubrication applicator.
Figure 4:
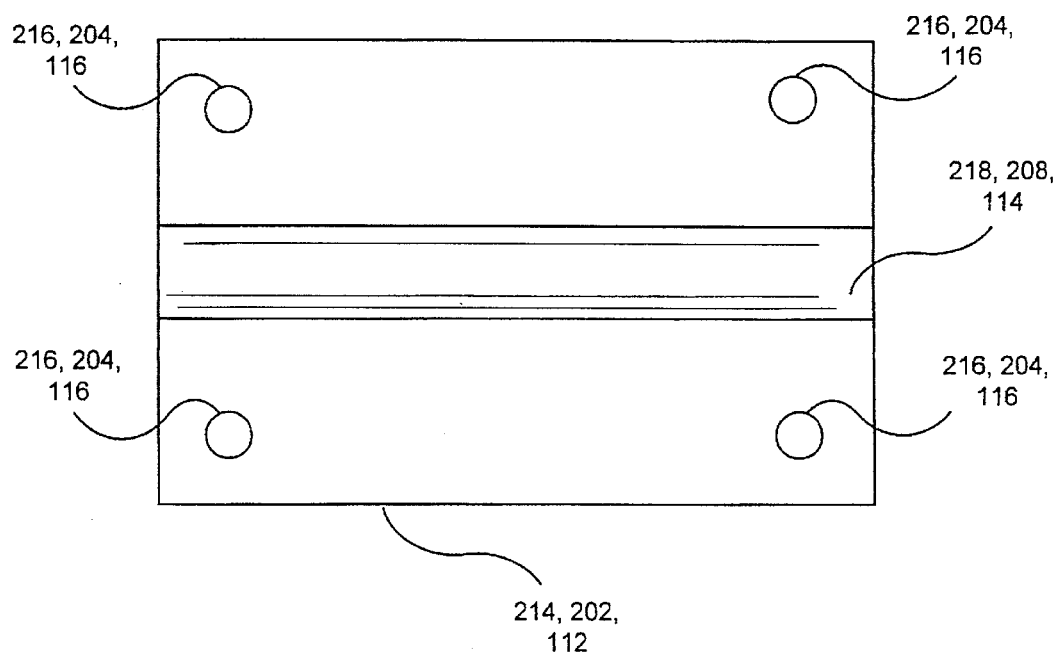
FIG. 4 is the plan view of the longitudinal channel in the bottom plate of the cable lubrication applicator (which is identical to the bottom plate of the cable lubrication sealer)

Referring to FIG. 1, a lubrication applicator 100 comprises a top plate 102 and a bottom plate 112 that are generally rectangular in shape and of approximately the same dimensions. A check valve 110, which preferably comprises a conventional Zerk fitting of the type commonly used for injecting grease into bearings, is threaded into a port 118 that is disposed at about the center of top plate 102. Four threaded fasteners 106 pass through top plate apertures 104 and are threaded into bottom plate apertures 116. A channel 108 having a rounded cross-sectional profile extends longitudinally across the bottom surface of top plate 102. When top plate 102 is attached to bottom plate 112, channel 108 faces toward a similar channel 114 having a rounded cross-sectional profile. Channel 114 extends longitudinally across the top surface of bottom plate 112. As shown in FIG. 3, port 118 extends into channel 108, providing a fluid path between channel 108 and check valve 110.

In the preferred embodiment, the upper portion of top plate apertures 104 has a diameter sufficient to receive fastener heads 109, and the lower portion of the apertures has a diameter slightly larger than threaded fastener shafts 107, but smaller than the heads of the fasteners. Fastener shafts 107 thus freely pass through top plate apertures 104, but fastener heads 109, which are larger, do not. The interior surfaces of bottom plate apertures 116 are tapped with threads 120 that match threads 111 on fastener shafts 107. Fasteners 106 are uniformly tightened to bring top plate 102 and bottom plate 112 together so that the top plate is substantially parallel with the bottom plate and so that the sheathed cable is at least partially enclosed within top channel 108 and bottom channel 114. The force exerted by top plate 102 against a sheathed cable 300, which is clamped between the top plate and bottom plate 112, seals the inner end of port 118 to an access aperture 304, creating a closed fluid path into an internal passage 308. This closed fluid path permits a user of the present invention to inject a lubricant (e.g., grease or other petroleum or synthetic friction reducing and corrosion inhibiting agent) through check valve 110 and into the internal passage of the sheathed cable to lubricate the surface of a control line 302. The lubricant flows through the internal passage of the sheathed cable for several feet in each direction, thereby coating the surfaces of the internal passage and the control line, and displacing moisture and any potentially corrosive materials that might have previously entered the internal passage through one of the ends of the sheathed cable. In addition, the lubricant has a preventive maintenance function, since it minimizes wear and friction between the inner surface of the internal passage and the control line. Premature failure and replacement of the sheathed cable is thereby avoided.

Top channel 108 and bottom plate channel 114 may not properly seal around sheathed cables with diameters smaller than the transverse cross-sectional size of the top and bottom channels. Referring to FIG. 1, an optional adapter 122 and an optional adapter 128 are shown. The optional adapters can be selected from a plurality of adapters of different thicknesses, and are used as necessary to ensure a tight seal between top plate 102 and access aperture 304 for various diameters of sheathed cables. Adapter 122 has a molded channel 124 with a rounded cross-sectional profile extending longitudinally across its bottom surface. An aperture 126 is proximally disposed in the top surface of adapter 122, providing a fluid path between check valve 110 and aperture 304. When adapter 122 is employed as the top adapter between top plate 102 and the sheathed cable, a bottom adapter substantially similar to adapter 122 is typically used between the sheathed cable and bottom plate 112. However, the bottom adapter need not (but may) have aperture 126.

In FIG. 1, optional adapter 128 is also shown. An aperture 130 is proximally disposed in the center of adapter 128, providing a fluid path between check valve 110 and aperture 304. When adapter 128 is used as the top adapter, a bottom adapter substantially similar to adapter 128 is also typically used. However, adapter 128 would not require aperture 130.

Adapter 122 preferably comprises a substantially rigid material having a thickness that is selected to fit the diameter of the sheathed cable. Alternatively, adapter 128 preferably comprises an elastomeric material formed as a planar sheet that molds around the curved outer surface of the sheathed cable. Such sheets would be provided in a plurality of thicknesses to seal around various diameter sheathed cables.

Figure 6:
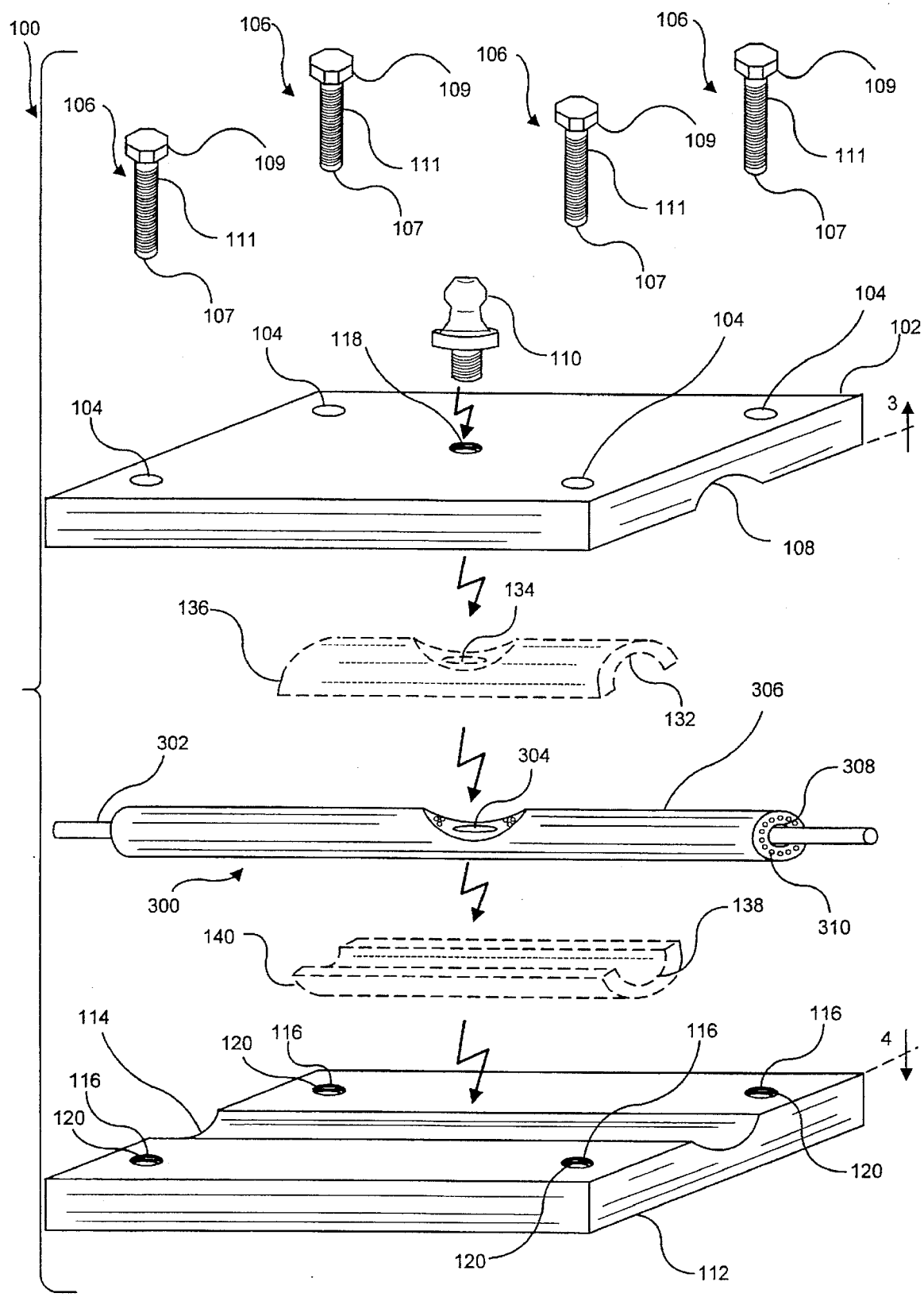
FIG. 6 is an exploded view of a cable lubrication applicator, an optional adapter, and a sheathed cable that has been prepared to receive an injection of lubricant.

In FIG. 6, an optional top adapter 136 and an bottom adapter 140 are shown. The optional adapters can be selected from a plurality of adapters of different thicknesses, and are used as necessary to ensure a tight seal between top plate 102 and access aperture 304 for various diameters of sheathed cables. Top adapter 136 has a molded channel 132 with a rounded cross-sectional profile extending longitudinally along its bottom surface. An aperture 134 is proximally disposed in the center of top adapter 136, providing a fluid path between check valve 110 and aperture 304. Top adapter 136 does not have a flange extending outwardly from molded channel 132. Bottom adapter 140 is substantially similar to top adapter 136, however, bottom adapter 140 does not require aperture 134. Top adapter 136 and bottom adapter 140 preferably comprise a relatively stiff elastomeric material provided in a range of thicknesses that are selected to fit different diameters of the sheathed cable.

Preparing Sheathed Cable

Figure 5:
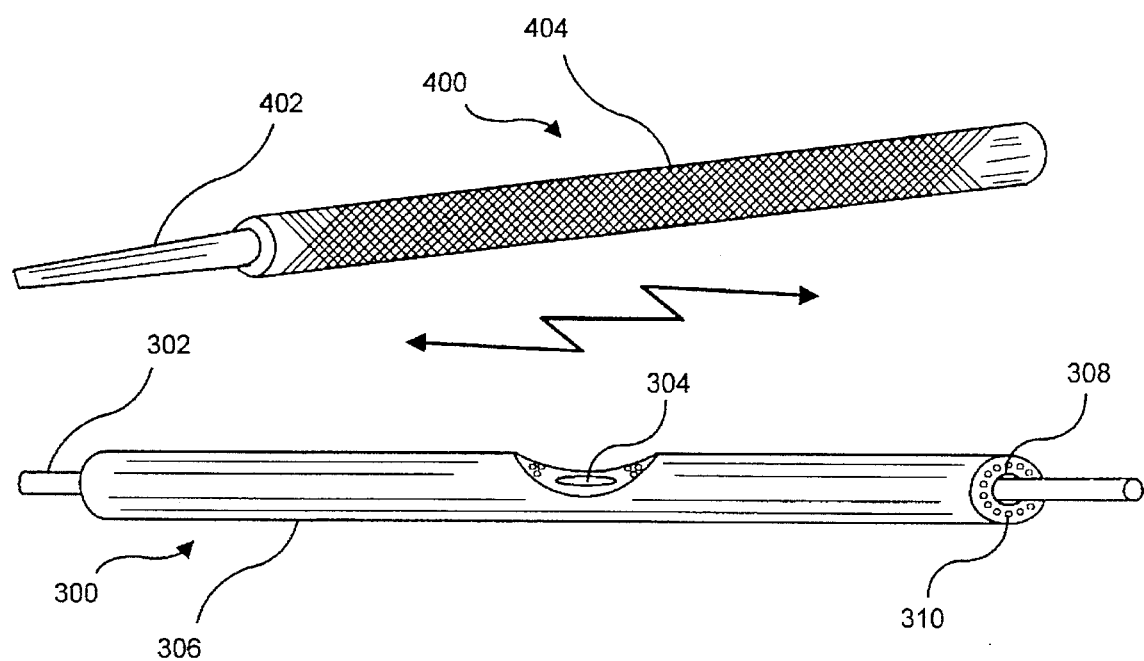
FIG. 5 is a perspective view showing how a file is used to form an access aperture in a sheathed cable.

Referring to FIG. 5, a sheathed cable 300 and a round (rattail) file 400 are shown. The preferred method for forming an aperture 304 in a sheath 306 is to abrasively cut through the sheath with file 400. File 400 is oriented perpendicularly to the longitudinal axis of sheathed cable 300 and is moved back and forth by a user (not shown), who is grasping file tang 402 (or a handle inserted thereon—not shown). The rapid oscillation of file teeth 404 across the exterior surface of sheath 306 abrades sheath 306 and creates access aperture 304. Care must be taken to ensure that the filing is stopped after aperture 304 is sufficiently deep to expose an internal passage 308 within sheathed cable 306 and a control line 302 that runs through the internal passage, but before abrasion of the control line by the file occurs. In the disclosed example, sheath 306 comprises the three layers described in the Background of the Invention, including a middle armored layer formed of helically coiled steel strands 310. Steel strands 310 strengthen sheath 306, preventing kinks and compression of the sheath, yet permit the sheathed cable to remain relatively flexible. However, file 400 easily cuts through the steel strands.

Cutting access aperture 304 into sheath 306 tends to reduce the structural strength of the sheath at that point; however, the present invention compensates by restoring any structural strength that is thus lost when the lubrication applicator is installed. Subsequently, after the lubricant applicator has been removed, the installation of a sealer 200 (shown in FIG. 2) restores the structural integrity of the sheathed cable.

Installing Lubricant Applicator on Sheathed Cable

After access aperture 304 has been formed, the installation of cable lubrication applicator 100 on sheathed cable 300 proceeds as follows. Referring again to FIG. 1, the portion of sheathed cable 300 in which access aperture 304 has been cut is positioned between top plate 102 and bottom plate 112. Sheathed cable 300 is seated within channel 114, with access aperture 304 disposed generally adjacent to the inner end of port 118. Alternatively, if required to fit a sheathed cable having a smaller diameter, adapter 122 or adapter 128 is inserted between the top plate and the sheathed cable, and the aperture in the adapter is aligned with access aperture 304. Bottom plate 112 is positioned under top plate 102, so that the sheathed cable 300 is seated in channel 108, which faces toward channel 114 and extends generally parallel thereto. If the bottom adapter is required for fitting a smaller diameter sheathed cable, it is inserted between the sheathed cable and the bottom plate. Bottom plate apertures 116 are then aligned with top plate apertures 104. Finally, four threaded fasteners 106 are inserted through top plate apertures 104, which are not threaded, and into bottom plate apertures 116, which are threaded. The threaded fasteners are tightened to compress sheathed cable lightly between top plate 102 and bottom plate 112.

After sheathed cable 300 is lubricated, lubrication applicator 100 can be removed and installed at one or more other points along the sheathed cable (or on a different sheathed cable) to inject the lubricant into the internal passage, e.g., of an adjoining section of the sheathed cable.

The steps required to remove the lubrication applicator are generally the reverse of those used in the installation procedure. Fasteners 106 are unscrewed from bottom plate apertures 116 and drawn out through top plate apertures 104. Next, top plate 102 and bottom plate 112 and any adapter plates installed are separated and removed from sheathed cable 300. However, once the lubrication applicator has been removed, steps must be taken to seal access aperture 304 to prevent moisture and corrosive substances entering the internal passage and to prevent leakage of the lubricant from the passage.

An alternative function for the lubrication applicator is to seal aperture 304. The steps required to seal aperture 304 using the lubrication applicator are generally consistent with those of the installation procedure. However, the placement of the top adapter and its corresponding bottom adapter are reversed. The prior bottom adapter is now used as the top adapter and the prior top adapter is now used as the bottom adapter. Aperture 304 in the sheathed cable is sealed by the bottom adapter, which does not include an aperture, when the sheathed cable is tightly compressed between the adapters and top plate 102 and bottom plate 112.

Lubrication Sealer

Figure 2:
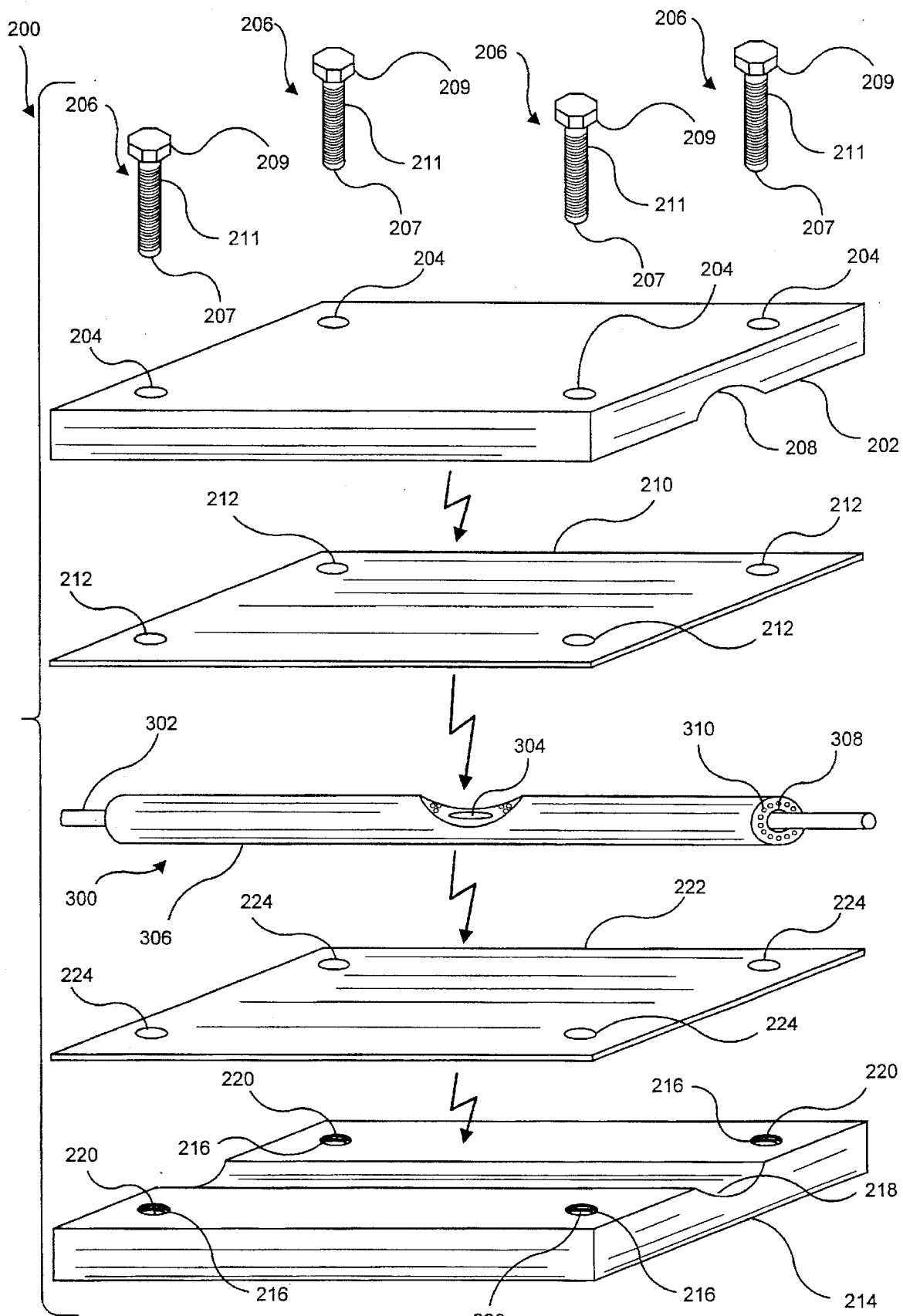
FIG. 2 is an exploded view of the cable lubrication sealer and sheathed cable that has received an injection of lubricant.

A preferred embodiment of cable lubrication sealer 200 that is used to seal access aperture 304 is shown in FIG. 2. Referring to FIG. 2, lubrication sealer 200 comprises a top plate 202 that is approximately the same size and shape as a bottom plate 214, a gasket 210, and four threaded fasteners 206 that pass through top plate apertures 204 and thread into bottom plate apertures 216. Additionally, top plate 202 has a channel 208 with a cross-sectional rounded profile. Channel 208 extends longitudinally across the bottom surface of top plate 208; a similar channel 218 extends longitudinally across the top surface of bottom plate 214. Thus, bottom plate 214 is identical to bottom plate 116 of lubrication applicator 100; and, top plate 202 is the same as top plate 102 of the lubrication applicator, except that top plate 202 does not include port 118. Gasket 210 is disposed between top plate 202 and bottom plate 214. As shown in FIG. 2, top gasket 210 and a bottom gasket 222 of an appropriate thickness could be used in the sealer 200 to accommodate a sheathed cable with a diameter smaller than that of the channels provided. The thickness of the gaskets may vary so that a gasket with an appropriate thickness may be selected to ensure a tight seal around access aperture 304 between top plate 202 and bottom plate 214 for sheathed cables with various diameters. Fasteners 206 connect top plate 202, gasket 210, and bottom plate 214 together, with sheathed cable 300 clamped between gasket 210 and bottom plate 214. The gasket comprises an elastomeric sheet of a synthetic rubber or plastic material that is resistant to damage by the lubricant injected into sheathed cable 300. Alternatively, the top and bottom adapters used with the lubrication applicator may be employed with the lubrication sealer. As disclosed above, it may be desirable to reverse the position of the top and bottom adapters, so that the bottom adapter covers the access aperture.

Installation of Lubrication Sealer

The installation of lubrication sealer 200 on sheathed cable 300 proceeds as follows. Sheathed cable 300 is seated within channel 218, with access aperture 304 positioned directly opposite channel 218. Gasket 210 is laid over the sheathed cable, covering access aperture 304, and extending outwardly on each side to cover the exposed top surface of bottom plate 214. Four gasket apertures 212 are aligned with bottom plate apertures 216. Top plate 202 is placed on gasket 210, with channel 208 facing channel 218 and generally seated over the sheathed cable. Top plate apertures 204 are aligned with gasket apertures 212 and bottom plate apertures 216. Finally, threaded fasteners 206 are installed and tightened to clamp top plate 202 and gasket 210 against the sheathed cable, which is compressed against bottom plate 214, thereby sealing the access aperture in the sheath.

The interior surfaces of bottom plate apertures 216 are tapped with threads 220 that match threads 211 on fastener shafts 207. Fasteners 206 are uniformly tightened so that top plate 202 is generally parallel to bottom plate 214. The lubricant sealer prevents lubricant leakage from the sheathed cable and precludes moisture and corrosive materials from entering access aperture 304. In addition, lubricant sealer 200 restores any lost of structural strength that might have resulted when access aperture 304 was cut. Since the lubricant sealer is clamped tightly around sheathed cable 300, longitudinally bridging both sides of access aperture 304, the sheathed cable is not subject to a kink occurring at the access aperture that might damage or even break the control line or sheath. Although the lubrication applicator can be left mounted on the sheathed cable instead of installing the lubrication sealer, it is preferable to install the lubrication sealer and use the lubrication applicator at a different point along the sheathed cable or even on a different sheathed cable, because the lubrication sealer is lower in cost.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description of a preferred embodiment and variations thereof, but instead be determined entirely by reference to the claims that follow.

The invention in which an exclusive right is claimed is defined by the following:

1. A lubrication applicator for a sheathed cable comprising:
   (a) a top plate that is generally planar;
   (b) a bottom plate that is generally planar;
   (c) a top channel disposed in a bottom generally planar surface of the top plate and extending along said bottom generally planar surface;
   (d) a bottom channel disposed in a top generally planar surface of the bottom plate and extending along said top generally planar surface;
   (e) a lubrication port proximally disposed in the top surface of the top plate;
   (f) a fluid path extending between the lubrication port and the top channel; and
   (g) a plurality of fasteners that couple the top plate to the bottom plate, with the top channel extending generally in parallel with the bottom channel, said lubrication applicator being thereby adapted to mount on the sheathed cable, with the top channel overlying an access aperture formed in the sheathed cable so that a lubricant can be forced into the sheathed cable through the lubrication port.

2. The lubrication applicator of claim 1, wherein the top channel and the bottom channel are concave shaped to at least partially enclose the sheathed cable when the top plate and the bottom plate are mounted on the sheathed cable.

3. The lubrication applicator of claim 1, wherein the top channel and the bottom channel are disposed, respectively, generally parallel with longitudinal axes of the top plate and bottom plate.

4. The lubrication applicator of claim 1, wherein the top plate and the bottom plate are generally parallel to each other when mounted on the sheathed cable.

5. The lubrication applicator of claim 1, wherein the lubrication port comprises a fitting that is threaded into the top plate.

6. The lubrication applicator of claim 1, wherein the lubrication port comprises a ball check valve.

7. The lubrication applicator of claim 1, wherein the fasteners freely pass through apertures in one of the top plate and the bottom plate and thread into apertures formed in the other of the top plate and the bottom plate.

8. The lubrication applicator of claim 1, further comprising a top adapter and a bottom adapter disposed respectively between the top plate and the bottom plate for sealing a fluid path from the lubrication port to an access aperture in a sheathed cable when the said sheathed cable has a small diameter.

9. A lubrication access aperture sealer for a sheathed cable, comprising:
   (a) top plate having a generally planar surface in which a top channel is formed;
   (b) a bottom plate having a generally planar surface in which a bottom channel is formed; and
   (c) a plurality of fasteners that connect the top plate to the bottom plate, with the sheathed cable clamped between the top channel and the bottom channel, so that a lubrication access aperture formed in the sheathed cable is substantially covered and sealed by one of the top plate and the bottom plate.

10. The lubrication access aperture sealer of claim 9, wherein the top channel extends the length of the bottom surface of the top plate and the bottom channel extends the length of the top surface of the bottom plate.

11. The lubrication access aperture sealer of claim 10, wherein the top channel and the bottom channel respectively extend substantially parallel to the longitudinal axes of the top plate and bottom plate.

12. The lubrication access aperture sealer of claim 10, wherein the top channel and the bottom channel are concave shaped so that the sheathed cable is at least partially enclosed by the top channel and the bottom channel.

13. The lubrication access aperture sealer of claim 9, wherein the top plate and the bottom plate are mounted generally parallel to each other when clamped around the sheathed cable.

14. The lubrication access aperture sealer of claim 9, further comprising a gasket disposed between a bottom surface of the top plate and a top surface of the bottom plate.

15. The lubrication access aperture sealer of claim 9, wherein the fasteners freely pass through apertures formed in one of the top plate and the bottom plate, and thread into apertures formed in the other of the top plate and the bottom plate.

16. A lubrication applicator for a sheathed cable comprising:
   (a) a top plate that is generally planar;
   (b) a bottom plate that is generally planar;
   (c) a plurality of fasteners for connecting the top plate to the bottom plate so that the top plate and the bottom plate are disposed on opposite sides of the sheathed cable; and
   (d) means for injecting a lubricant into the sheathed cable through an access aperture formed in the sheathed cable when it is disposed between the top plate and the bottom plate.

17. The lubrication applicator of claim 16, further comprising means for adapting the top and the bottom plate to seal around the access aperture in the sheathed cable.

18. A lubrication access aperture sealer for a sheathed cable comprising:
   (a) a top plate that is generally planar;
   (b) a bottom plate that is generally planar;
   (c) means for clamping the top plate to the bottom plate from opposite sides of the sheathed cable; and
   (d) means for sealing an access aperture in the sheathed cable when said access aperture is substantially covered by one of the top plate and the bottom plate.

19. The lubrication access aperture sealer of claim 18, further comprising the means for adapting the top plate and the bottom plate to seal around the access aperture in the sheathed cable, to accommodate different diameter sheathed cables.

20. A method for lubricating a sheathed cable in situ comprising the steps of:
   (a) forming an access aperture in a sheath of a previously fabricated sheathed cable, so that an interior longitudinal passage within the sheath is exposed by the access aperture;
   (b) clamping a generally planar plate having a groove formed therein over the sheathed cable, a lubrication port that passes through the plate into the groove being aligned with the access aperture, in sealing relationship thereto; and
   (c) injecting a lubricant through the lubrication port into the interior longitudinal passage within the sheathed cable.

21. The method of claim 20, further comprising the steps of:
   (a) removing the lubrication port from the sheathed cable; and
   (b) clamping a seal onto the sheathed cable to cover the access aperture and restore any loss of structural strength in the sheathed cable caused by forming the access aperture.

22. A method for lubricating a sheathed cable in situ, comprising the steps of:
   (a) cutting an access aperture in the sheath of the sheathed cable so that a longitudinally extending internal passage within the sheathed cable is exposed;
   (b) clamping two plates that are generally planar on opposite sides of the sheathed cable so that a lubricant injection port disposed in one of the plates overlies the access aperture in sealing relationship therewith;
   (c) injecting a lubricant into the longitudinally extending internal passage of the sheathed cable through the lubricant injection port to lubricate a control wire that is disposed therein;
   (d) removing the plate in which the lubricant injection port is disposed from the sheathed cable; and
   (e) clamping a generally planar sealing plate over the access port to substantially seal it.

23. The method of claim 22, further comprising the step of adapting the top plate and the bottom plate to seal around the access aperture in the sheathed cable when said sheathed cable has a small diameter.

24. The method of claim 22, wherein the two plates each include grooves that at least partially enclose the sheathed cable when the two plates are clamped about the sheathed cable.

25. The method of claim 24, further comprising the step of coupling the two plates together using a plurality of fasteners.

26. The method of claim 22, wherein the sealing plate is provided with a elastomeric gasket that seals the access aperture.

27. The method of claim 22, further comprising the step of coupling the sealing plate to one of the two plates in which the lubricant injection port is not disposed using a plurality of threaded fasteners.

28. A method for lubricating a sheathed cable in situ, comprising the steps of:
   (a) forming an access aperture in a sheath of a sheathed cable so that an interior surface of the sheath is exposed;
   (b) disposing the access aperture between a top plate and a bottom plate of a lubrication applicator, said top plate and said bottom plate being generally planar;
   (c) injecting a lubricant into the interior of the sheathed cable through the lubrication applicator;
   (d) removing the lubrication applicator; and
   (e) sealing the access aperture by mounting a generally planar plate over the access aperture.

29. The method of claim 28, further comprising the step of adapting the top and the bottom plate to seal around the access aperture in the sheathed cable to accommodate different diameters of said sheathed cable.

30. The method of claim 28, wherein the step of sealing the aperture includes the step of reinforcing the sheathed cable at the point where the access aperture is formed to restore structural strength of the sheathed cable that was lost when the access aperture was formed.

31. The method of claim 28, wherein the step of forming the access aperture comprises the step of cutting a notch in the sheath of the sheathed cable.

* * * * *